United States Patent [19]
Schard

[11] 3,900,534
[45] Aug. 19, 1975

[54] THERMOPLASTIC FILMS BASED ON BLENDS OF POLYPROPYLENE AND POLYBUTENE

[75] Inventor: Malcolm P. Schard, Califon, N.J.

[73] Assignee: Mobil Oil Corporation, New York, N.Y.

[22] Filed: May 7, 1973

[21] Appl. No.: 357,754

[52] U.S. Cl............... 260/897 A; 264/289; 264/290
[51] Int. Cl. ............................................ C08f 29/12
[58] Field of Search ................................ 260/897 A

[56] References Cited
UNITED STATES PATENTS
3,356,765  12/1967  Musso et al........................ 260/897

FOREIGN PATENTS OR APPLICATIONS
835,330  5/1960  United Kingdom................. 260/897
775,184  2/1968  Canada.............................. 260/897

Primary Examiner—John C. Bleutge
Assistant Examiner—C. J. Seccuro
Attorney, Agent, or Firm—Charles A. Huggett; James D. Tierney

[57]  ABSTRACT

A biaxially oriented thermoplastic film structure formed from a resinous blend comprising polypropylene and polybutene, polybutene being present in an amount of more than 10% but less than 20% by weight, based upon the total weight of the blend.

3 Claims, No Drawings

THERMOPLASTIC FILMS BASED ON BLENDS OF POLYPROPYLENE AND POLYBUTENE

BACKGROUND OF THE INVENTION

1. Field of the Invention

The present invention relates to blends of thermoplastic materials and oriented shrink films produced therefrom having improved properties. More particularly, the present invention relates to blends of polypropylene resin and polybutene-1 resin wherein said polybutene is present in an amount of more than 10% but less than 20% based upon the total weight of the resinous blend mixture. Such resinous blends have been found especially useful in the fabrication of shrink films having unexpectedly excellent heat seal characteristics as well as exhibiting good optical properties.

2. Description of the Prior Art

In the past a wide variety of resinous thermoplastic materials have been employed in the manufacture of heat shrinkable films including oriented polyethylene which has been irradiated and oriented polypropylene for example. Additionally, U.S. Pat. Nos. 3,634,552 and 3,634,553 disclose the employment of resinous blend mixtures suitable for the production of heat shrink films. These patents disclose mixtures such as polypropylene blended with varying amounts of an ethylene-butene-1 copolymer resin containing minor amounts of ethylene. Canadian Pat. No. 775,184 discloses the employment of blends of polypropylene and polybutene-1, such blends, according to this patent, being suitable for the production of biaxially oriented films. U.S. Pat. No. 3,356,765 discloses the employment of blends of polypropylene and polybutene-1 as suitable for producing relatively thick sheets, i.e., thicker than a packaging film material which is usually on the order of about one to two mils or less.

SUMMARY OF THE INVENTION

It has now been found that certain properties including heat seal strength and optical clarity of shrink films may be improved by fabricating such films from resinous blends of polypropylene and polybutene, polybutene being present in a minor amount of more than 10% but less than 20% by weight based upon the total weight of the blend. In a more specific aspect, the polybutene content of the blend composition comprises an amount, in the range of about 12 to about 18% by weight, sufficient to impart to film prepared from said blend higher heat seal strength than a comparable blend but containing 10 or 20% of polybutene while retaining good optical properties. It has been found that by controlling the amount of polybutene present in such blends, within a relatively narrow range, that shrink films may be produced exhibiting improved properties.

DESCRIPTION OF SPECIFIC EMBODIMENTS

The polypropylene resin component of the shrink film compositions in accord with the present invention is a highly isotactic polypropylene, i.e, for example, a polypropylene having a solubility isotactic index of at least about 90 as measured in heptane. Such polypropylene is produced, as is well-known in the art, by polymerizing propylene in the presence of stereospecific catalyst systems. Such polypropylene homopolymers include those which are formed in the presence of minor amounts of ethylene monomers, i.e., on the order of less than 5% by weight added to facilitate film-forming techniques and film properties formed from such resins.

The polybutene-1 resins which may be employed in the resinous blend compositions, in general, have an isotactic index (weight percent insoluble in diethyl ether) of about 80 or higher and usually about 90 or more. A procedure which may be employed to produce isotactic polybutene-1 suitable for employment in the present invention is fully described in U.S. Pat. No. 3,362,940. Examples of polybutene resins which are particularly suitable for employment in the resinous blend compositions to produce films in accord with the present invention are those exhibiting the following ranges of physical properties.

| | |
|---|---|
| Melt Index | 0.5 – 5.0 |
| Density (g/cc) | 0.905 – 0.912 |
| Tensile Yield Strength (p.s.i.) | 1500 – 2200 |
| Tensile Break Strength (p.s.i.) | 3800 (minimum) |
| Elongation (%) | 300 (minimum) |

A number of prior art orientation techniques may be employed to stretch and form the shrink film structures of the present invention. In general, oriented films may be obtained by stretching processes in which tensions capable of stretching the film are applied to the film, the directions of which form an angle of about 90°. These film stretching tensions to orient the film may be applied sequentially to produce a biaxially oriented film as when a film is stretched initially in one direction and thereafter stretched in a direction 90° divergent from the first stretching direction. Also, the film may be biaxially stretched and oriented simultaneously whereby longitudinal and transverse tensions are applied to the film at the same time resulting in a simultaneous longitudinal and transverse stretching of the film. Such latter processes are well known in the art and include, for example, the "double-bubble" method which comprises extrusion of a tubular base film, cooling of the tubular film, reheating and inflation of the tube and simultaneously drawing the inflated tube in a longitudinal direction thereby imparting biaxial orientation to the film. A common method and apparatus for the sequential biaxial orientation of film comprises passing the film sheet through a series of rotating draw rollers which impart longitudinal direction stretch and subsequently transversely drawing the longitudinally stretched film, for example, by passing it through a heated tenter frame wherein the film is stretched in a transverse direction.

Prior to extrusion into a film structure, the polypropylene and polybutene-1 components comprising the blend composition of the present invention are blended together to form a substantially homogenous resin mixture. This may be accomplished, for example, by masticating the components on a slightly warm, differential speed, two-roll mill or in similar polymer blending machinery, such as a Banbury mill. The blend is then extruded into a film utilizing a standard extruder and tubular or flat film die and is subsequently oriented utilizing any one of a number of prior art film orientation techniques as hereinbefore described.

Various gauges of shrink film may be manufactured utilizing the novel resin compositions of the present invention and the gauge may generally vary from about 0.10 mil up to about 10 mils and preferably from about 0.5 mil to about 2.0 mils depending to a great extent on the type of shrink film packaging applications for which the film is manufactured.

EXAMPLE I

A mixture of (a) 85% by weight of polypropylene a high isotactic content resin having a melt index at 230°C. of 0.7; and (b) 15% by weight of polybutene-1 having the following properties:

| | |
|---|---|
| Melt Index | 1.8 |
| Melting Point (differential thermal analysis) | 121°C. |
| Tensile Yield Strength (p.s.i.) | 1587 |
| Tensile Break Strength (p.s.i.) | 3917 |
| Density (g/cc) | 0.906 |
| Elongation (percent) | 411 |

It was blended utilizing a Banbury mill and subsequently fed into the hopper of a standard, rotating screw, extrusion apparatus which served to further mix and melt the blend. The temperature of the melt within the extruder was maintained at about 490°F. The blend was subsequently extruded in the shape of a tube from a tubular die affixed to the outlet end of the extruder, the die being maintained at a temperature of about 450°F. The tube was quenched to a temperature of about 140°F., which was substantially below the crystalline melting points of the resinous components of the film, immediately upon emergence from the die. The extruded tube had an external diameter of about 4⅛ inch and a wall thickness of about 25 mils. Upon cooling the tube was collapsed by a set of nip rollers and passed into a preheat oven wherein it was reheated. The temperature of the preheat oven was maintained at about 405°F. in the entry zone thereof and at approximately 1,050°F. at the exit zone of the oven with the exiting tube having a surface temperature of about 275°F. The collapsed, heated tube was immediately re-inflated with air under pressure which expanded the heated tube by a ratio of about 5.9:1 in a transverse direction and a substantially similar ratio in the longitudinal direction. The expanded tube was subsequently collapsed by a pair of draw rollers operating at a rotational speed higher than the rotational speed of said nip rollers. The biaxially oriented tube was then passed to a set of wind-up rollers.

In the following Table I, physical properties are given for the shrink film, i.e., Blend B, produced in accordance with Example 1. For comparative purposes, also reported in Table 1 are the physical properties of two other shrink films (i.e., Blend A and Blend C), formed in accordance with the procedure of Example 1, from resinous blend compositions outside the scope of the present invention. All films were 0.75 mil in thickness.

Heat sealing may be effected by any of the conventional means known in the art, including hot wire, bar and dielectric. Depending upon various factors including thickness and type of sealer, dwell time is generally about 0.5–2 seconds and sealing temperature is 300° to 400°F. In the following Table 1 heat seals were formed utilizing a standard hot wire impulse sealer. An impulse of 125 volts was applied across a 0.0036 inch diameter nichrome wire for an impulse dwell time of 0.2 second and a sealing jaw dwell time of 0.9 second. The applied pressure during sealing was about 20 p.s.i. Heat seal strength data presented in the following Table was determined utilizing a standard tensile testing machine, in accordance with A.S.T.M. Designation D 882.

TABLE I

| | | Blend A | Blend B | Blend C |
|---|---|---|---|---|
| % Polybutene-1 | | 10 | 15 | 20 |
| % Polypropylene | | 90 | 85 | 80 |
| Tensile Modulus (psi) | *MD | 241,500 | 203,000 | 199,000 |
| | TD | 237,800 | 187,000 | 184,000 |
| Tensile Strength at Break (psi) | MD | 21,010 | 23,100 | 23,800 |
| | TD | 24,000 | 19,900 | 20,100 |
| % Elongation at Break | MD | 49 | 53 | 54 |
| | TD | 68 | 58 | 84 |
| Haze, % (A.S.T.M. D-1003) | | 1.5 | 1.6 | 2.0 |
| Gloss, % at 45° (A.S.T.M. D-2457-65T) | MD | 87.4 | 85.9 | 83.7 |
| | TD | 87.0 | 84.8 | 82.6 |
| Coefficient of Friction (A.S.T.M. D 1894-63) | | 0.42 | 0.39 | 0.39 |
| % Shrink at 130°C. | | 40.8 | 40.9 | 39.7 |
| Shrink Force at 95°C. (psi) | MD | 345 | 326 | 286 |
| | TD | 460 | 338 | 359 |
| Seal Strength (psi) | MD | 6,770 | 13,500 | 10,600 |
| | TD | 5,640 | 11,500 | 10,800 |

*MD = Machine Direction   TD = Transverse Direction

It can be seen from the data presented in foregoing Table 1 that the resinous blend compositions of the present invention, e.g. Blend B, containing more than 10% polybutene and less than 20% thereof (e.g., 15%) exhibits a combination of good haze properties and exceptionally high seal strengths as contrasted to films fabricated from blends of polypropylene containing 10% polybutene-1 or 20% polybutene-1 by weight. As shown by the data contained in Table 1 when films are fabricated from blends containing 10% by weight of polybutene-1 (i.e., Blend A) such films, although they possess acceptable haze characteristics, exhibit undesirably low heat-seal strengths. Increasing the amount of polybutene-1 to the 20% by weight level (i.e., Blend C) results in a film having somewhat improved heat seal properties, however, the haze level is increased to the point to make such films undesirable for certain packaging applications where the "see-through" characteristics of the film are most important. As shown in Table 1, films produced from blends containing more than 10% polybutene and less than 20% thereof by weight, such as Blend B which contains 15% by weight of polybutene-1, exhibit unexpectedly high heat seal strengths. Such seal strengths are unexpectedly greater than those obtained from Blends A and C, 10% and 20% by weight of polybutene-1 respectively and, additionally, the haze characteristics of the films of Blend B make such films ideally suited for packaging applications requiring high transparency.

Additives to impart desired film surface properties may be incorporated into the polymer blend compositions of the present invention, for example, additives which reduce or eliminate the films' tendency to fog with condensed moisture from emitting commodities such as fresh meats and produce. Also, antistatic additives which reduce the tendency of the film to build up static electricity charges and many others such as anticling additives; additives which promote film slip; and additives which reduce the tendency of multiple layers of film to block together may be added to the blend compositions.

Although the present invention has been described with preferred embodiments, it is to be understood that modificatons and variations may be resorted to without departing from the spirit and scope of this invention as those skilled in the art will readily understand.

What is claimed is:

1. A heat shrinkable biaxially oriented thermoplastic film comprising a resinous mixture containing:
   a. from about 82% to about 88% by weight of a high isotactic content polypropylene resin; and
   b. from about 12% to about 18% by weight of a high isotactic content polybutene resin;

said film having a thickness of from about 0.10 mil up to about 10 mils, said thermoplastic film being further characterized in that it has improved optical properties in comparison to film containing 20% by weight of said polybutene resin in said mixture and improved heat seal strength characteristics in comparison to films containing 10% by weight of said polybutene in said mixture.

2. A film as defined in claim 1 which comprises a biaxially oriented film tube.

3. A film as defined in claim 1 which comprises about 85% by weight of said polypropylene and about 15% by weight of said polybutene.

* * * * *